US008459674B2

(12) United States Patent
Mielke et al.

(10) Patent No.: US 8,459,674 B2
(45) Date of Patent: Jun. 11, 2013

(54) CONTROL ARM FOR A MOTOR VEHICLE

(75) Inventors: Oliver Mielke, Altenbeken (DE); Tobias Ebbing, Hövelhof (DE); Florian Hessing, München (DE)

(73) Assignee: Benteler Automobiltechnik GmbH, Baderborn (DE)

( * ) Notice: Subject to any disclaimer, the term of this patent is extended or adjusted under 35 U.S.C. 154(b) by 39 days.

(21) Appl. No.: 13/164,269

(22) Filed: Jun. 20, 2011

(65) Prior Publication Data

US 2012/0153592 A1    Jun. 21, 2012

(30) Foreign Application Priority Data

Jun. 22, 2010    (DE) .......................... 10 2010 024 634

(51) Int. Cl.
    *B60G 3/04*    (2006.01)
(52) U.S. Cl.
    USPC .................................................. 280/124.134
(58) Field of Classification Search
    USPC ....................... 280/124.134–124.136; 72/110
    See application file for complete search history.

(56) References Cited

U.S. PATENT DOCUMENTS

| | | | | |
|---|---|---|---|---|
| 4,722,211 A | * | 2/1988 | Tsukamoto et al. ............... 72/70 |
| 4,762,336 A | * | 8/1988 | Ogawa et al. ............ 280/124.15 |
| 5,163,603 A | * | 11/1992 | Richart ....................... 228/141.1 |
| 5,322,317 A | * | 6/1994 | Kusaka et al. .......... 280/124.134 |
| 5,607,177 A | * | 3/1997 | Kato ....................... 280/124.134 |
| 5,727,411 A | * | 3/1998 | Sakakibara et al. ............ 72/110 |
| 6,298,962 B1 | * | 10/2001 | Kato et al. ...................... 188/371 |
| 6,572,126 B2 | * | 6/2003 | Tunzini ................... 280/124.134 |
| 6,749,360 B2 | * | 6/2004 | Abels .............................. 403/381 |
| 6,905,129 B2 | * | 6/2005 | Runte et al. ............ 280/124.134 |
| 7,261,307 B2 | * | 8/2007 | Nuno et al. ............. 280/124.151 |
| 7,293,787 B2 | * | 11/2007 | Nunez et al. ........... 280/124.134 |
| 7,530,586 B2 | * | 5/2009 | Tardy-Tuch et al. ... 280/124.137 |
| 7,556,273 B2 | * | 7/2009 | Streubel et al. ........ 280/124.133 |
| 7,665,751 B2 | * | 2/2010 | Kunert et al. .......... 280/124.134 |
| 7,761,993 B2 | * | 7/2010 | Mahler et al. ................ 29/889.7 |
| 7,914,025 B2 | * | 3/2011 | Mayen et al. .......... 280/124.109 |
| 7,938,417 B2 | * | 5/2011 | Ersoy et al. ............ 280/124.134 |
| 8,167,325 B2 | * | 5/2012 | Lee et al. ................ 280/124.134 |
| 8,251,386 B2 | * | 8/2012 | Chiku et al. ........... 280/124.134 |
| 2002/0005621 A1 | * | 1/2002 | Christophliemke et al. ....................... 280/124.134 |
| 2004/0135337 A1 | * | 7/2004 | Alesso et al. .......... 280/124.134 |
| 2004/0140641 A1 | * | 7/2004 | Eppelein ................ 280/124.135 |
| 2006/0175786 A1 | * | 8/2006 | Streubel et al. ........ 280/124.134 |
| 2006/0220330 A1 | * | 10/2006 | Urquidi et al. ............. 280/5.516 |
| 2007/0040345 A1 | * | 2/2007 | Hardtke et al. ........ 280/124.164 |
| 2007/0228684 A1 | * | 10/2007 | Bowers ................... 280/124.134 |
| 2009/0008891 A1 | * | 1/2009 | Jang et al. .............. 280/124.134 |
| 2011/0115186 A1 | * | 5/2011 | Chiku et al. ........... 280/124.134 |

(Continued)

FOREIGN PATENT DOCUMENTS

| | | |
|---|---|---|
| DE | 10 2005 004 917 | 8/2006 |
| JP | 58089409 A * | 5/1983 |
| JP | 58089410 A * | 5/1983 |

(Continued)

*Primary Examiner* — Nicole Verley
(74) *Attorney, Agent, or Firm* — Henry M. Feiereisen LLC

(57) ABSTRACT

A control arm for a motor vehicle includes a single-shell base body having a flat bottom and lateral legs which are formed by bending the bottom. Attached to the base body are plural bearings, with at least one of the lateral legs having a recess provided between two of the bearings.

26 Claims, 3 Drawing Sheets

U.S. PATENT DOCUMENTS

2011/0272911 A1* 11/2011 Gerhards et al. ........ 280/124.134
2011/0285102 A1* 11/2011 Yu et al. ................. 280/124.134
2011/0298192 A1* 12/2011 Yu et al. ................. 280/124.134
2012/0018974 A1*  1/2012 Mielke et al. .......... 280/124.134

FOREIGN PATENT DOCUMENTS

JP           05085119 A   *  4/1993
WO     WO 2010/066226 A1    6/2010

* cited by examiner

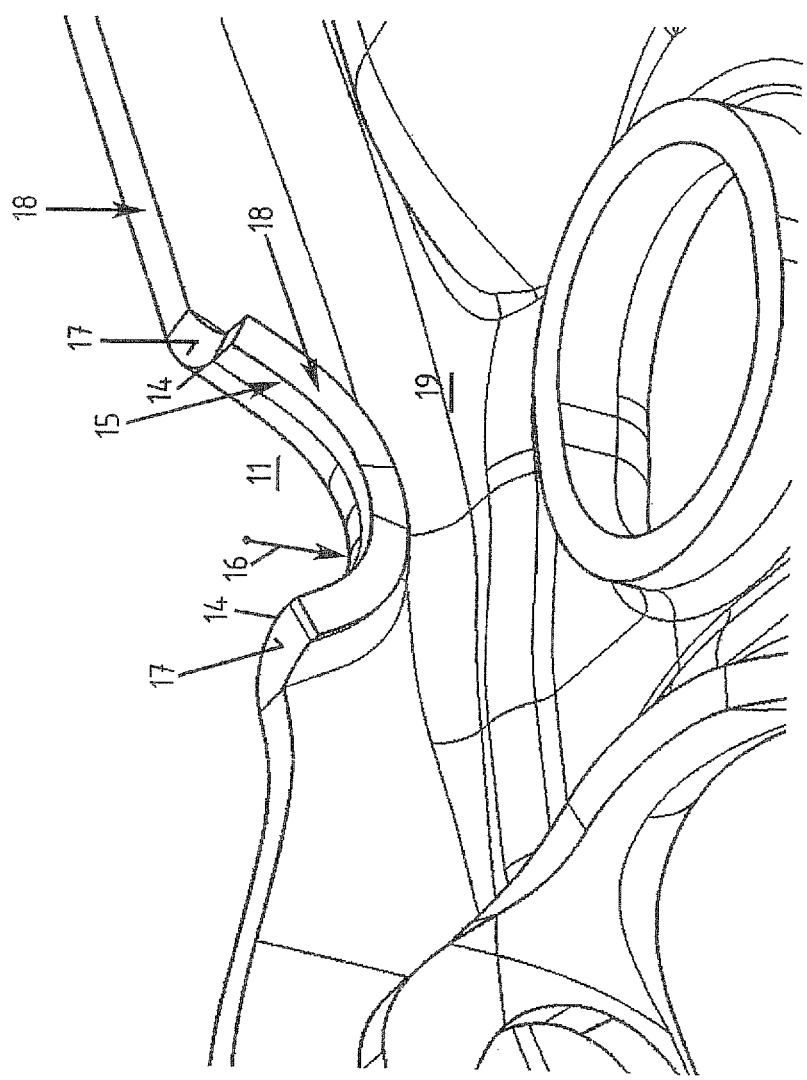

CONTROL ARM FOR A MOTOR VEHICLE

CROSS-REFERENCES TO RELATED APPLICATIONS

This application claims the priority of German Patent Application, Serial No. 10 2010 024 634.4-21, filed Jun. 22, 2010, pursuant to 35 U.S.C. 119(a)-(d), the content of which is incorporated herein by reference in its entirety as if fully set forth herein.

BACKGROUND OF THE INVENTION

The present invention relates to a control arm for a motor vehicle.

The following discussion of related art is provided to assist the reader in understanding the advantages of the invention, and is not to be construed as an admission that this related art is prior art to this invention.

Operation of motor vehicles on or off-road oftentimes involves accidents or improper handling of the motor vehicles by the driver. To date, motor vehicles have self-supporting bodies, equipped with chassis components that are attached to the bodies. The bodies are highly complex structures to protect the vehicle interior or vehicle compartments in the event of damage. When the damage, caused for example by hitting the curb or when the wheels and fenders strike a solid object or another motor vehicle, is minor, high forces can still be transferred via the attachments to the wheels, for example via the control arm, so that the body may deform in an undesired way. Even after repair of this unwanted deformation, the vehicle geometry or the passenger compartment can be restored only inadequately, leading to a higher potential risk for injury of occupants, when the passenger compartment is deformed to a greater extent.

It would therefore be desirable and advantageous to provide an improved control arm for a motor vehicle, to obviate prior art shortcomings.

SUMMARY OF THE INVENTION

According to one aspect of the present invention, a control arm for a motor vehicle includes a single-shell base body having a flat bottom and lateral legs which are formed by bending the bottom, and plural bearings attached to the base body, wherein at least one of the lateral legs has a recess provided between two of the bearings.

To ensure clarity of terms, it will be understood by persons skilled in the art that the term "recess" should be construed as being realized by a removal of material.

The presence of the recess establishes in the at least one lateral leg of the single-shell basic body a virtual predetermined breaking point. In accordance with the present invention, the control arm can be produced in a cost-efficient manner and provided with a recess in such a way as to attain a long service life while still exhibiting a high strength to keep any damage to the motor vehicle to a minimum in the event of an accident. In the presence of wheel forces being transmitted to the vehicle body and involving lateral guidance forces, static and dynamic axle loads, and longitudinal guidance forces, the recess ensures a high dynamic strength of the control arm while exhibiting a controlled buckling behavior in the event of an overload.

According to another advantageous feature of the present invention, the recess may extend in orthogonal relationship to a longitudinal axis of the motor vehicle. The recess is thus provided on one lateral leg which is substantially aligned in y direction of the motor vehicle. The recess thus extends substantially in y direction. This is advantageous because forces caused in the event of an accident can be separated in such a way that the control arm can buckle in parallel relationship to the transverse vehicle axis in the event of an overload. This prevents joint attachment points of the control arm from disengagement so that it is ensured that the wheel carrier remains for as long as possible on the control arm in the event of overload.

This ensures that the kinetic energy, caused by the impact, is absorbed via the wheel at the control arm in the form of kinetic energy. In the event the wheel strikes the area of the fender or wheel box, a desired large-area deformation is caused to prevent an unwanted deformation of the axle attachment point or of the axle auxiliary frame. Overall, the damage is less in the event of an accident and may conceivably be repaired by simply replacing the control arm.

According to another advantageous feature of the present invention, the recess may extend in orthogonal relationship to a transverse axis of the motor vehicle. Thus, the recess is provided on the one lateral leg in a direction which is aligned substantially in the x direction of the motor vehicle. The afore-described advantages are also applicable for this alignment. Overload forces in vehicle longitudinal direction and vehicle transverse direction can thus be separated and can be adjusted for example by two recesses on one control arm.

According to another advantageous feature of the present invention, the recess may have at least one area provided with a collar. The single-shell configuration of the control arm can be realized in the form of a sheet metal part. Production of a collared recess is easy. For example, during a forming process of the control arm, the recess can be made in the form of a collared hole or half of a collared hole. The presence of a collar is also advantageous because residual stress in particular in the region of the surfaces but also in the entire region of the recess and surrounding zone of the recess can be reduced in a targeted manner by a collar in the form of a stress deflection. Thus, the presence of a collar eliminates the possibility of stress peaks or stress cracks as a result of fatigue behavior.

According to another advantageous feature of the present invention, the recess may have a toroidal configuration. The recess can be formed by removing a substantially half-round or rounded material site Separation may be realized for example during the manufacturing process in the form of punching or also during production of a collar by a forming process. The toroidal profile of the recess has a positive effect on the stress pattern encountered in the control arm by wheel forces being transferred. The substantially half-round geometry significantly prevents the presence of stress peaks and promotes a homogenous stress pattern. Advantageously, corner regions of the recess are also rounded to prevent the presence of angular geometries.

According to another advantageous feature of the present invention, the recess may have a polygonal configuration. Polygonal in this context is to be understood within the scope of the present invention as relating to a triangular, tetragonal, rectangular or any other multi-lateral geometry. The advantage of a polygonal configuration, for example triangular configuration, resides in the possibility to establish a desired buckling moment which is able to cause a buckling of the control arm when exceeding a predefined overload force. This overload force can be precisely adjusted up to several newtons within the scope of the invention.

According to another advantageous feature of the present invention, the recess can be defined in a longitudinal direction by a length of 0.01 to 100 mm, preferably 0.1 to 60 mm. Currently preferred is a length of 1 to 50 mm. The recess may be realized as a grain or as milled or sawed gap or also with a geometric shape in the lateral leg. The longitudinal direction of the recess is hereby so implemented as to extend over the lateral leg. The geometric dimension of especially 1 to 50 mm in length ensures the manufacture of the recess on a control arm that is able to transmit wheel forces in the order of up to 50 kN or more.

In the event of an overload which can be adjusted in the order of 10 kN up to more than 50 kN, the control arm buckles about the axis which is oriented in orthogonal relationship to the longitudinal axis of the recess.

According to another advantageous feature of the present invention, the collar may extend in orthogonal relationship to the at least one of the lateral legs and have a length of 0.1 to 20 mm. Currently preferred is a length of 1 to 10 mm. In this way, the collar can be produced in a very cost-efficient manner. The collar can be produced as the control arm undergoes a forming process. The geometric dimension of the collar towards or away from the control arm has a positive effect on the stress pattern within the recess.

According to another advantageous feature of the present invention, the recess is defined by a radius which may range from 0.1 to 40 mm. Currently preferred is a radius of 1 to 30 mm. The recess may hereby have a toroidal or elliptic configuration. The radius may vary over the course of the recess. This also has a positive effect on the stress pattern in the recess. As a result of a moderated and homogenous stress pattern, there are no fractures by fatigue, or cracking. It is thus possible to precisely adjust or set a buckling moment or triggering moment, caused by an overload, to up to few newtons.

According to another advantageous feature of the present invention, the recess may be surrounded by a marginal area of a hardness which differs from a hardness of the base body. The marginal area may hereby have a greater or smaller hardness than the base body. By tailoring the hardness in the material structure in the area of the recess, the buckling behavior of the control arm can be positively influenced.

According to another advantageous feature of the present invention, the recess or the marginal region or both may have at least one region which is heat treated. Heat treatment of some regions, for example inductive irradiation or infrared irradiation, enables the implementation of a material structure of specific hardness. This also positively affects buckling behavior of the control arm in the event of an overload.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 3 is an enlarged detailed view of a variation of a recess.

DETAILED DESCRIPTION OF PREFERRED EMBODIMENTS

Figure 1:
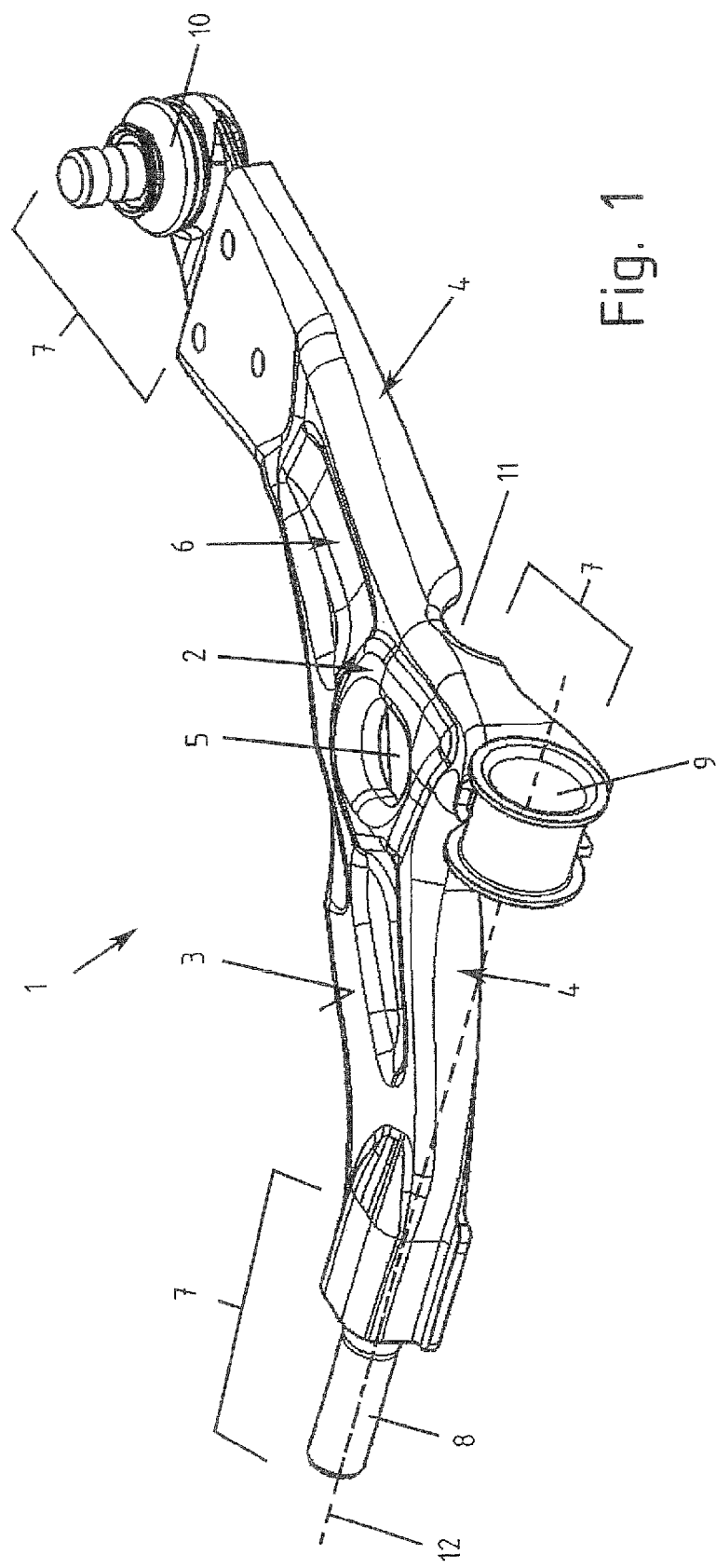
FIG. 1 is a perspective illustration of a control arm for a motor vehicle in accordance with the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a perspective illustration of a control arm for a motor vehicle in accordance with the present invention, generally designated by reference numeral 1. The control arm 1 is configured in the form of an A-arm and includes a single-shell base body 2 having a substantially flat bottom 3 which is formed with lateral legs 4. In the example shown here, the lateral legs 4 are bent inwards for orientation in orthogonal relationship to the bottom 3 so as to extend approximately at a right angle to the bottom 3. The bottom 3 has an installation opening 5 and stiffening embossments 6 for reinforcement.

Plural bearings 7 are arranged on the base body 2 and implemented for example as a bearing pin 8, a bearing eyelet 9, and a ball-and-socket joint 10, respectively. Of course, other types of bearings may also be applicable as well. A recess 11 is formed between the bearing eyelet 9 and the ball-and-socket joint 10 in the respective lateral leg 4 extending there between. The recess 11 extends substantially orthogonal to a pivot axis 12 established by the bearing eyelet 9 and the bearing pin 8. The pivot axis 12 can be oriented in the motor vehicle in a direction of the vehicle longitudinal axis or vehicle transverse axis.

Figure 2:
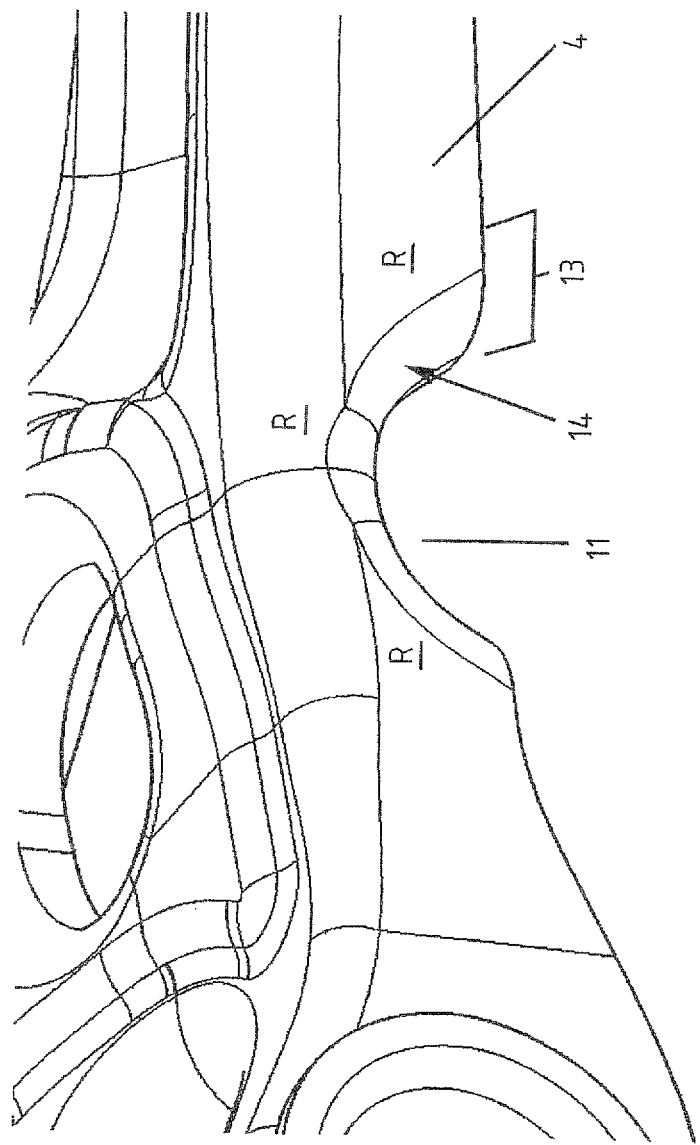
FIG. 2 is an enlarged detailed view of the control arm in an area of a recess.

FIG. 2 shows an enlarged detailed view of the control arm 1 in an area of the recess 11. As can be seen, the recess 11 has a rounded edge 14 in a transition zone 13 to the lateral leg 4. The recess 11 is surrounded by a marginal area R which lies in the lateral leg 4. The marginal area R may also be sized to continue into the bottom 3 of the base body 2.

FIG. 3 shows an enlarged detailed view of a variation of a control arm 1 having a collared recess 11, with a collar 15 being oriented in a direction to the control arm 1. The recess 11 has a toroidal geometry and is defined by a radius 16 which may vary over a length thereof, in particular in the terminal transition zones 17 to the lateral legs 4. The terminal transition zones 17 have an upper rounded edge 18 on the lateral leg 4. The collar 15 extends into an interior space 19 of the control arm 1.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A control arm for a motor vehicle, comprising:
   a single-shell base body having a flat bottom and lateral legs which are formed by bending the bottom; and
   plural bearings attached to the base body,
   wherein at least one of the lateral legs has a recess provided between two of the bearings, wherein the recess has at least one area provided with a collar.

2. The control arm of claim 1 constructed as A-arm.

3. The control arm of claim 1, wherein the recess extends in orthogonal relationship to a longitudinal axis of the motor vehicle.

4. The control arm of claim 1, wherein the recess extends in orthogonal relationship to a transverse axis of the motor vehicle.

5. The control arm of claim 1, wherein the recess has a polygonal configuration.

6. The control arm of claim 1, wherein the recess is defined in a longitudinal direction by a length of 0.01 to 100 mm.

7. The control arm of claim 1, wherein the recess is defined in a longitudinal direction by a length of 0.1 to 60 mm.

8. The control arm of claim 1, wherein the recess is defined in a longitudinal direction by a length of 1 to 50 mm.

9. The control arm of claim 1, wherein the collar extends in orthogonal relationship to the at least one of the lateral legs and has a length of 0.1 to 20 mm.

10. The control arm of claim 1, wherein the collar extends in orthogonal relationship to the at least one of the lateral legs and has a length of 1 to 10 mm.

11. The control arm of claim 1, wherein the recess is defined by a radius of 0.1 to 40 mm.

12. The control arm of claim 1, wherein the recess is defined by a radius of 1 to 30 mm.

13. The control arm of claim 1, wherein the recess is surrounded by a marginal area of a hardness which differs from a hardness of the base body.

14. The control arm of claim 13, wherein the recess or the marginal region or both have at least one region which is heat treated.

15. A control arm for a motor vehicle, comprising:
a single-shell base body having a flat bottom and lateral legs which are formed by bending the bottom; and
plural bearings attached to the base body,
wherein at least one of the lateral legs has a recess provided between two of the bearings, wherein the recess has a toroidal configuration.

16. The control arm of claim 15 constructed as A-arm.

17. The control arm of claim 15, wherein the recess extends in orthogonal relationship to a longitudinal axis of the motor vehicle.

18. The control arm of claim 15, wherein the recess extends in orthogonal relationship to a transverse axis of the motor vehicle.

19. The control arm of claim 15, wherein the recess has a polygonal configuration.

20. The control arm of claim 15, wherein the recess is defined in a longitudinal direction by a length of 0.01 to 100 mm.

21. The control arm of claim 15, wherein the recess is defined in a longitudinal direction by a length of 0.1 to 60 mm.

22. The control arm of claim 15, wherein the recess is defined in a longitudinal direction by a length of 1 to 50 mm.

23. The control arm of claim 15, wherein the recess is defined by a radius of 0.1 to 40 mm.

24. The control arm of claim 15, wherein the recess is defined by a radius of 1 to 30 mm.

25. The control arm of claim 15, wherein the recess is surrounded by a marginal area of a hardness which differs from a hardness of the base body.

26. The control arm of claim 25, wherein the recess or the marginal region or both have at least one region which is heat treated.

* * * * *